S. J. HODGE.
ANIMAL TRAP.
APPLICATION FILED MAR. 1, 1913.
1,068,400.
Patented July 22, 1913.
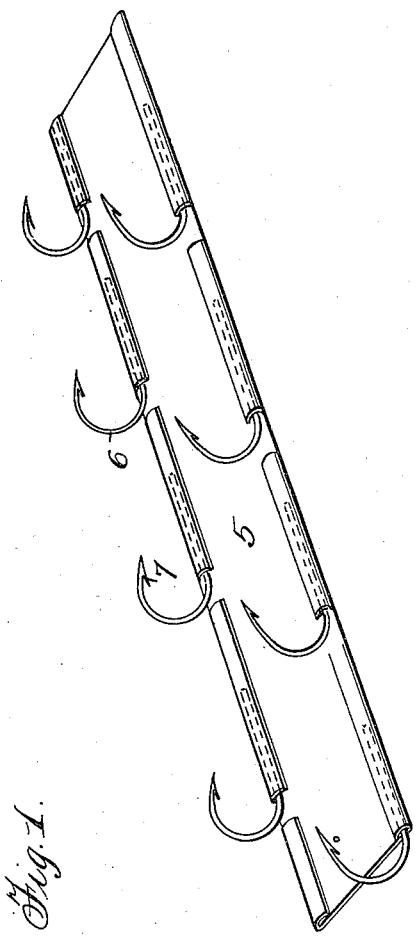
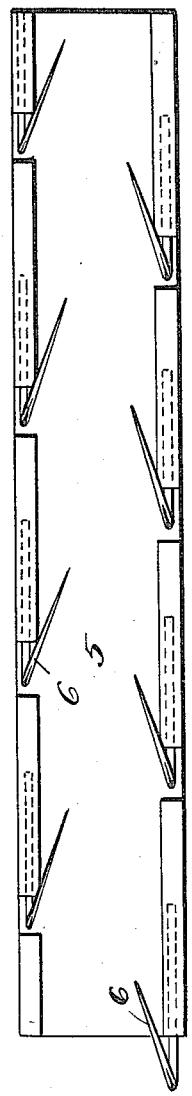
Inventor
Sidney J. Hodge
By A. A. Knight
Attorney
Witnesses
A. M. Murray.
L. P. Hines.

UNITED STATES PATENT OFFICE.

SIDNEY J. HODGE, OF ORTING, WASHINGTON.

ANIMAL-TRAP.

1,068,400. Specification of Letters Patent. Patented July 22, 1913.

Application filed March 1, 1913. Serial No. 751,626.

*To all whom it may concern:*

Be it known that I, SIDNEY J. HODGE, citizen of the United States, residing at Orting, in the county of Pierce and State of Washington, have invented new and useful Improvements in Animal-Traps, of which the following is a specification.

This invention relates to animal traps and has for its object, the provision of a device of this character adapted to be placed in the holes of gophers, squirrels and like destructive rodents, said trap being constructed in such manner as to impale the animals as hereinafter set forth.

Further objects and advantages of the invention will be set forth in the detailed description which now follows.

In the accompanying drawing, Figure 1 is a perspective view of a trap constructed in accordance with the invention, and Fig. 2 is a plan view thereof.

Like numerals designate corresponding parts in both of the figures of the drawing.

Referring to the drawing, the numeral 5 designates a base, preferably of sheet metal and which, when in use, is to be painted the color of the ground. At its opposite edges this base is bent over to form pockets for the reception of hooks 6, these hooks being of substantially the form of ordinary fish hooks and are provided with barbs 7. By referring to Fig. 2, it will be seen that these hooks are disposed in staggered relation and that the hooks upon the opposite sides of the base are inclined toward the median line of the base. By staggering the hooks with relation to each other, the resultant passage is rendered a zigzag one and the animal will more surely become impaled upon the hooks as hereinafter set forth.

In use the device is placed in position in the hole of the animal with the hooks pointing toward the mouth of the hole. When the animal attempts to pass outwardly it is frequently the case that when it sees the light, it starts to go back into the hole, or the rustling of leaves or the movement of any object near the mouth of the hole that alarms the animal, will cause it to attempt to go back into the hole. When the animal attempts to do this, it is caught between the hooks and as soon as it is pricked by the hooks, its struggles to reënter the hole will become more frantic and it will thereby impale itself on the barbs.

It is a well known fact that gophers, squirrels, and like rodents annually do great damage in the grain growing regions. The gopher makes a hole independent of a hill of wheat or corn, but the squirrel burrows directly into the hill.

While the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. An animal trap comprising a flat, rigid, base and a row of forwardly directed barbed hooks at each edge of said base.

2. An animal trap comprising a flat, rigid, base and a row of forwardly directed barbed hooks at each edge of said base, the hooks of one row being disposed in staggered relation to the hooks of the other row.

3. An animal trap comprising a base and a row of forwardly directed barbed hooks at each edge of said base, the hooks of one row being disposed in staggered relation to the hooks of the other row, and all of said hooks being inclined toward the median line of the base.

4. An animal trap comprising a base portion of sheet metal having its edges bent over to form pockets and a plurality of curved barbed hooks, the shanks of which are disposed in said pockets, the points of all of said hooks being directed toward one end of the base, the hooks at one edge of said base being disposed in staggered relation to the hooks at the opposite edge of said base, and all of said hooks being inclined toward the median line of said base.

In testimony whereof I have hereunto set my hand in presence of two subscribing witnesses.

SIDNEY J. HODGE.

Witnesses:
M. F. MCNEIL,
IRENE B. BLISS.

---

Copies of this patent may be obtained for five cents each, by addressing the "Commissioner of Patents, Washington, D. C."